March 24, 1942.   L. W. OLIVER   2,277,141
COMPOSITE COLOR PHOTOGRAPHY
Filed July 18, 1939   2 Sheets-Sheet 1
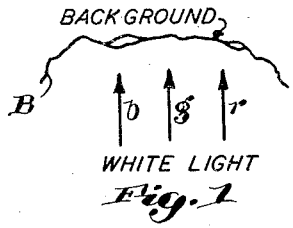
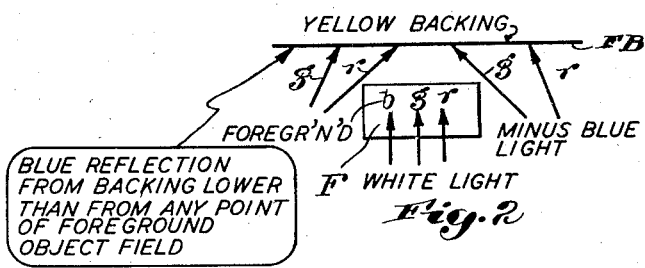
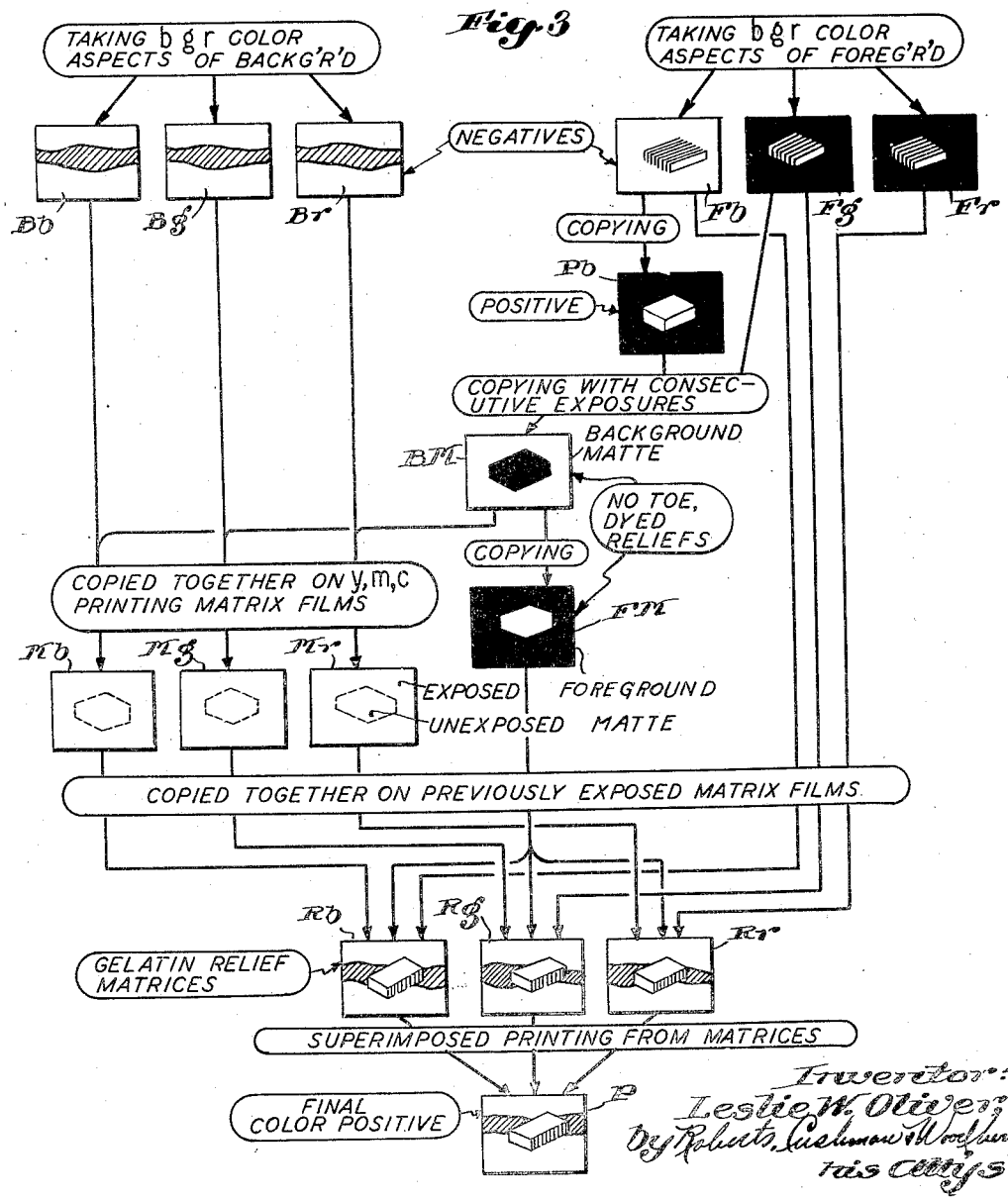

March 24, 1942.     L. W. OLIVER     2,277,141
COMPOSITE COLOR PHOTOGRAPHY
Filed July 18, 1939     2 Sheets-Sheet 2
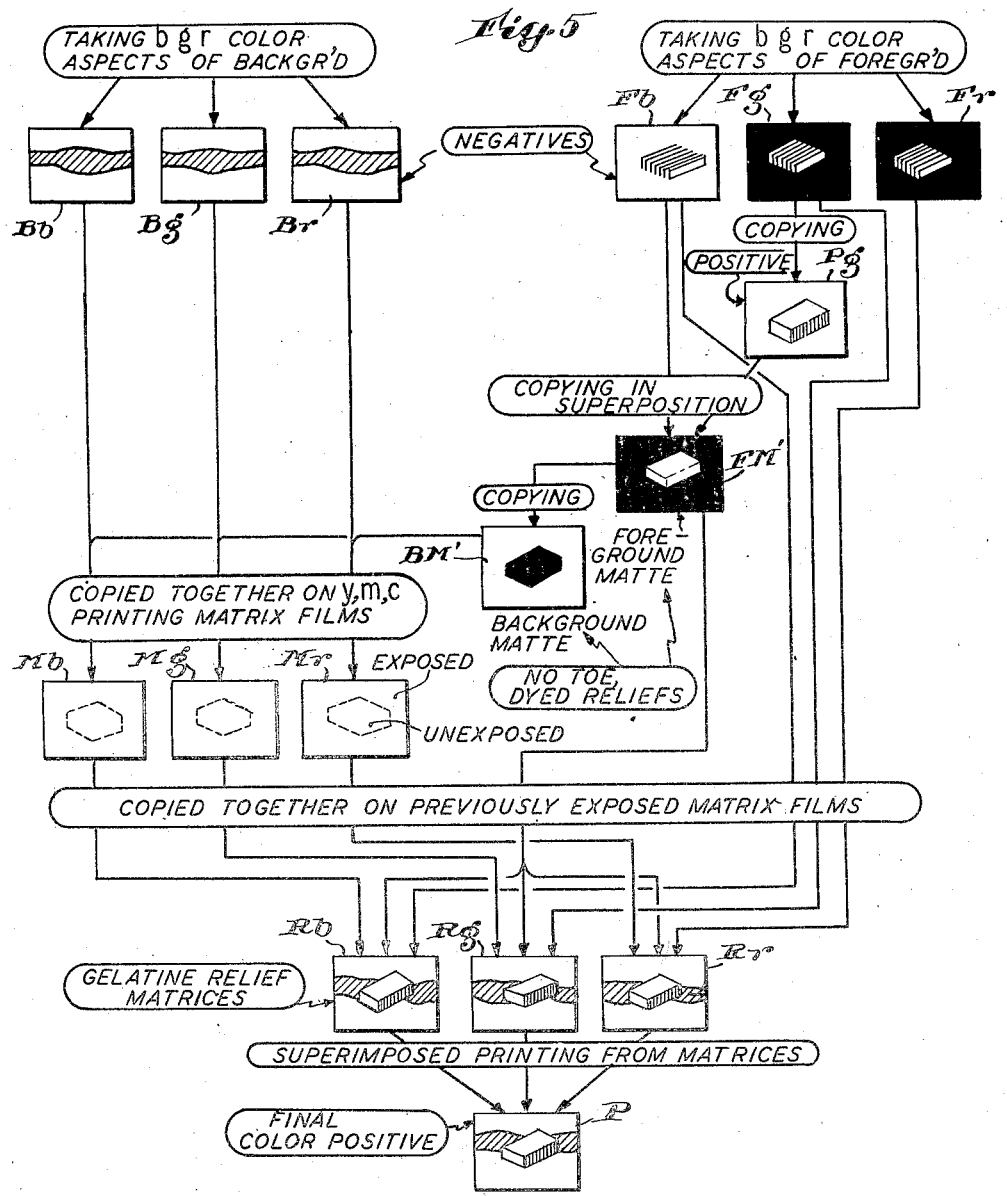
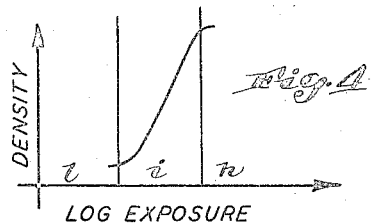

Patented Mar. 24, 1942

2,277,141

UNITED STATES PATENT OFFICE 2,277,141

COMPOSITE COLOR PHOTOGRAPHY

Leslie W. Oliver, Amersham, England, assignor to Technicolor Motion-Picture Corporation, Los Angeles, Calif., a corporation of Maine Application July 18, 1939, Serial No. 285,067

7 Claims. (Cl. 88—16)

In the production of motion picture films it is often desirable to record on two different picture areas object fields separately set up and photographed; in this manner background scenery may be combined with foreground action, replacing the often difficult procedure of projecting background scenes on a screen behind a foreground set; so-called special process (trick) exposures are also made in this manner. Various methods for accomplishing this purpose have been proposed, using in most cases so-called mattes or masks for screening selected film areas, but in their previously suggested forms these methods are unsuited for purposes of color cinematography.

It is the principal object of the present invention to provide a method of composite cinematography which is especially suited for motion pictures in natural colors, although some of its features are advantageous for black and white cinematography. For that purpose the invention provides for the illumination of object fields to be photographed, for photographing them, and for the photographic treatment of records taken, in such a manner that proper differentiation of the several record areas is with certainty secured and fringes as will as double records at any portion of a film frame avoided; in another aspect, the invention contemplates correlation of the spectral ranges reflected from certain object fields with the ranges recorded on color separation films, for making mattes in a manner reducing auxiliary process steps, and hence cost and chance of failure to a minimum.

These and other objects, and aspects of the invention will be apparent from the following description of typical embodiments illustrating the genus of the invention by way of example, the description referring to drawings in which:

Figs. 1 and 2 are diagrams indicating the illumination according to the invention, of background and foreground object fields, respectively;

Figs. 3 and 5 are flow diagrams of two modifications of the process according to the invention; and Fig. 4 is a diagram illustrating characteristics of an emulsion used for making mattes.

It may be assumed that a given foreground action should be photographed against a background object field, background and foreground to be taken separately for technical reasons; for example, the foreground may be a magic carpet flying with a person thereon in front of a fanciful backgorund. This is a scene which, for obvious reasons, could be taken in a single shot only with difficulty, especially if the film is to be in natural colors which circumstance presents for example considerable practical objections against using a projected background.

In Fig. 1, a background object field is indicated at B, and this field is illuminated with white light containing the blue, green and red spectral ranges. These ranges will be herein indicated by letters $b$, $g$ and $r$ whereas the complementary ranges will be termed yellow (minus blue), magenta (minus green) and cyan (minus red) and indicated by letters $y$, $m$ and $c$. It is understood that these and corresponding terms are not strictly confined to spectral ranges inducing the perception of these hues, but relate to main regions into which the spectral range may be divided for purposes of color photography.

The foreground F (Fig. 2), for example a magic carpet set, is likewise illuminated with white light, and has a uniform backing FB showing as little detail as possible. This backing may be painted yellow, with a pigment reflecting substantially only the green and red spectral ranges, and in that case would be illuminated with green and red light; in other words such a backing (and its illumination) has the spectral quality minus blue. For the same purpose a backing of the background projection screen type, illuminated from behind, may be used.

Both background and foreground with backing are photographed with a color separation camera, for example of the type described in Patent No. 2,072,091, or on integral pack film, according to well-known methods.

There will now exist two sets of blue, green and red recording negatives, namely $Bb$, $Bg$, $Br$ of the background and $Fb$, $Fg$ and $Fr$ of the foreground with backing, as shown in Fig. 3. The background field may be illuminated as customary for pictures of this type, but the foreground scene F with backing FB should be illuminated in such a manner that the green reflection from the backing (colored and illuminated with minus blue light as mentioned above) is at no point of less intensity than the green reflection from any point of the foreground. The reason for this will be explained in detail hereinafter.

As indicated in Fig. 3, the backing area of negative $Fb$ will be essentially clear, since this blue recording film has not received any light from the minus blue backing. On the other hand, the corresponding areas of green and red recording films $Fg$ and $Fr$, respectively, will be rather dense, having been exposed to the green and red spectral ranges reflected from the backing. The foreground proper will be recorded as usual on color separation negatives of this type but, because of the above-mentioned precaution, the foreground area of negative $Fg$ will nowhere have a density higher than the density of its backing area.

From the blue and green foreground negatives two mattes are now made, for example according to the embodiment shown in Fig. 3, as follows: A positive Pb is printed from the blue recording foreground negative Fb, and a light sensitive film is consecutively exposed to negative Fg and positive Pb. Since the backing area on both Fg and Pb is of high density, this new print BM, herein referred to as background matte, will have a low density backing area, with little or no detail. On the other hand, the consecutive printing of a positive and a negative of the foreground scene will furnish a rather dense foreground area of matte BM.

In the matte, the photographic contrast of backing and foreground areas should be as high as possible, in order to magnify small exposure differences between backing and foreground areas, so that, in the present embodiment, the minus blue backing will be rendered transparent in the matte, and the foreground area uniformly opaque. As described and claimed in copending application Serial No. 314,059, filed January 16, 1940, of Steward De Motte Brown, a record of this type may be provided by printing negative Fg and positive Pb on an imbibition matrix type film with an emulsion made in accordance with Patents Nos. 1,804,727 and 2,044,864, care being taken to avoid any pre-exposure or fogging of such film. Positive emulsions of this type, if exposed in conformity with the absorption of the filter dye or dyes incorporated therein, furnish records characterized by a log exposure-density curve whose steepness increases with increasing exposure values. Since, as above mentioned, any fogging treatment (whose effect is described in Patent No. 1,677,665) is avoided, the formation of a low density "toe" is avoided, so that the resulting characteristic curve is in essence represented by a rather steep line located substantially only within an intermediate density region.

If an emulsion of this type, exposed as described, is treated to produce a gelatine relief, as for example described in Patent No. 1,919,673, by means of hardening the exposed portions and dissolving the unhardened portions, and if this relief is then dyed for example with yellow dye, the resulting record will be essentially clear or fully transparent for actinic light in the low exposure area, and in the high exposure region substantially opaque for light affecting the usual positive emulsions.

The corresponding characteristic curve will have the shape indicated in Fig. 4. Due to this shape, low intensity exposures will up to a certain intermediate value result in a substantially clear record area, whereas, beginning with that intermediate exposure value, the corresponding densities will rapidly increase. In other words, for practical purposes, exposure intensities up to a given intermediate value (which can, to a certain degree, be selected at will) are not recorded, whereas intensities beyond that value will produce opaque areas, there being only a very short half tone region corresponding to an intermediate exposure range $i$; exposures below and above this range $i$ producing no densities or practically opaque densities, respectively.

The film BM produced in this manner will therefore constitute a true and effective mask with any detail of the foreground field as well as of the backing being eliminated, the area of the former being opaque gelatine, and that of the latter clear celluloid from which the gelatine is etched off.

Matte BM is then copied on a further film, if desired according to the above-described procedure; a second matte with opaque backing and clear foreground areas, respectively, being obtained in this manner; this second matte is herein referred to as foreground matte FM.

Three matrix films Mb, Mg and Mr, of the type commonly used for that purpose, are now exposed to background negatives Bb, Bg and Br, respectively, each exposure being limited by means of background matte BM to the background area exclusive of the foreground area represented in the matte by its uniformly opaque silhouette. Therefore, this exposure furnishes latent records of the background combined with an unexposed foreground area.

Films Mb, Mg and Mr are then exposed to foreground negatives Fb, Fg and Fr, through foreground matte FM which screens the previously exposed background area but permits exposure of the foreground area recorded on the foreground negatives. The three matrix films are then developed and converted into gelatine reliefs, for example according to the process described in the above-mentioned Patent No. 1,919,673.

From these three relief matrices, indicated at Rb, Rg and Rr of Fig. 3, the final positive is then printed according to the well-known imbibition process, this positive constituting a combined record, in natural colors, of separately photographed background and foreground object fields B and F.

It has been mentioned before that the reflection, from the foreground object of green light (preferably also the red light and, of course, the yellow proper range around $580\mu\mu$) should be of lesser intensity than similar reflection from the backing, it being in addition assumed that the backing reflects so little blue light that any foreground object will reflect more blue light than the backing. If for any point of the foreground area the green light affecting negative Fg were stronger than similar light exposing the backing area of that film, the above-described technique of producing extreme contrast in order to provide a silhouette matte might result in a transparent spot within the foreground area of background matte BM, which again would permit printing of the background through that spot, in the next step of the procedure. The reason for this will now be apparent; if a portion of the foreground would reflect more green (including yellow) light than the backing, this portion would record on blue sensitive film Fb with less density, and on green sensitive film Fg with higher density than the backing, and that portion would be darker than the backing in Pb. The consecutive printing of Fg and Pb would expose the area of this portion to a lesser degree than the backing area, with the result that this exposure would be at the left of region $i$ of Fig. 4. Hence, the above-described contrast increasing technique would produce within the silhouette of matte BM a clear area corresponding to the spot.

As will be discussed hereinbelow, the light reflected from the backing may consist of spectral ranges other than the abovementioned minus blue range; generally speaking, backing light fully exposing one and substantially not affecting the other of two negatives used for making the mattes, should be more intense than similar light coming from any one point of the foreground.

Instead of obtaining mattes by consecutively printing a foreground negative and a foreground positive with opaque backing areas, similar mattes can be made by way of simultaneously printing two foreground records with clear backing areas; this modification will now be described with reference to Fig. 5. According to this embodiment, a positive Pg is made of green recording negative Fg, which positive is then superposed on negative Fb and printed simultaneously with the latter. Employing the above-described technique for printing according to copending application Serial No. 314,059, a foreground matte FM' is obtained, from which is copied a background matte BM'. These two mattes are then used as above described and again indicated in Fig. 5, for printing three matrices from the six original negatives.

It will be evident that, according to Fig. 3, records Pb and Fg have to be printed in succession in order to obtain maximum exposure of the entire foreground area because superposed printing would result in overall obstruction of that area; on the other hand, the combination of records with low density backing areas, as in Fig. 5 must be performed by superposition since, in this instance, the above-mentioned overall obstruction of the foreground area is required.

It will further be understood that various types of original records can be used, and that it is for example feasible to use, as mentioned above, integral monopack film for making the original records as well as for printing the mattes as long as one of the well-known techniques for differentiating pack records is used and the described rules for illuminating foreground and backing are observed, and a contrast exaggerating method for forming the mattes is employed. Also, the final print can be made by methods other than imbibition printing; for example negatives and mattes may be printed in superposition on integral tripack stock. In many instances, master positives or duplicate negatives will be employed in accordance with well-established practice; for example, instead of printing matrices, Mb, Mg, Mr directly, master positives could be made instead, or master positives could be used instead of the six original negatives, duplicate composite negatives made therefrom and these used for printing the matrix positives.

Instead of using the blue and green recording foreground negatives for making the mattes, the blue and red records may be used, care being taken that the blue and red (including yellow proper) light reflected from foreground and backing, respectively, conforms to the condition above described for the blue and green (including yellow) light that is, the blue reflection from the backing should be lower than from any point of the foreground, and the red reflection from the backing should be at no point of less intensity than the reflection from any point of the foreground.

Instead of using a minus blue illuminated backing, as above described, other spectral ranges can be used for illuminating the backing. For example, the backing could be painted with red absorbing material and illuminated with cyan (minus red) light. The red recording negative, having a substantially unexposed backing area, would then be used together with the blue recording or green recording negative for making the background and foreground mattes; care would be taken that the blue or green reflections from the foreground field are higher than the reflection of the same spectral ranges from the backing.

In actual practice it was found that minus blue illumination of a yellow background is most satisfactory; this is due to the fact that yellow coloring matter reflects or transmits very little blue and, therefore, actually produces an almost perfect "minus" color, whereas other coloring matters always reflect some light of the spectral range which they are supposed to eliminate, which renders more difficult the above-described regulation of the color ranges reflected from backing and foreground.

Further, instead of illuminating the backing with light composed of two ranges, a single range can be used for that purpose. For example, by illuminating the backing with blue light, and the foreground again with white light, a blue recording negative with high density backing area is obtained, whereas the backing area of the two other negatives will be of low density. Taking then for example the blue and green recording negatives, mattes can again be obtained as outlined above, by first making a positive of one of these two negatives and then combining it with the other negative. In this instance, the blue light reflected from the backing should be stronger than the blue light reflected from the foreground, in order to avoid transparent portions within the foreground area of the background matte.

The above-described printing steps, and especially the combined printing of negatives and mattes must be performed very carefully in exact register, any inaccuracy in positioning the various records resulting in overlapping of, or gaps between, background and foreground records, which are of course undesirable. It was found that a printer which permits printing with negative and film to be exposed in contact, with a beam which is dark over the matte area, is especially satisfactory for this purpose, since the matte area can then be optically shifted relatively to the two other films which are securely registered in a contact printing device. This printing method is described more in detail in copending application Serial No. 332,755, filed on May 1, 1940, of John F. Kienninger.

It should be understood that the present disclosure is for the purpose of illustration only and that this invention includes all modifications and equivalents which fall within the scope of the appended claims.

I claim:

1. In the art of composite photography with mattes for covering part of the record field, the method of making pictures in natural colors which comprises illuminating a background object field with light comprising two spectral ranges, making original background records of the color aspects corresponding to said ranges, illuminating a foregrond object field with light comprising said ranges, illuminating a uniform backing placed behind said foreground field and preponderantly reflecting light of a selected one of said ranges, with light of said selected range, making original foreground with backing records of the color aspects corresponding to said ranges, the illumination with light of said selected range of said foreground and of said backing being adjusted to dispose the reflection of light of said selected range from all points of the foreground and from the backing, respectively, on different sides of an intermediate light intensity value, making from one of said original foreground records a positive record, printing a matte record from said positive record and from the other original foreground record, processing said matte record to densities corresponding to extreme exposures on different sides of said intermediate value, and photographically printing said original records in superposition with said matte.

2. In the art of composite photography where pictures are printed with a matte covering part of the record field, the method of making pictures in natural colors which comprises illuminating a back ground object field with light comprising two spectral ranges, making original background records of the two color aspects corresponding to said ranges, illuminating a foreground object field with light comprising said two ranges, illuminating a uniform backing absorbing one of said ranges and placed behind said foreground object field with light of the other range, making original foreground with backing records of the two color aspects corresponding to said ranges, the illumination with light of said other range of said foreground field as well as of said backing being regulated in such a manner that its reflection from all points of the foreground field is of somewhat lower intensity than its reflection from the backing, making from one of said original foreground records a positive record, printing a combined record from said positive record and from the other original foreground, developing said combined record to a high contrast between the backing and foreground portions, respectively, making foreground and background mattes with said combined record, and photographically printing composite records from said original records together with said mattes.

3. In the art of composite photography where pictures are printed with a matte covering part of the record field, the method of making pictures in natural colors which comprises illuminating a background object field with substantially white light, making original records of the blue, green and red color aspects of said background field, illuminating a foreground object field with substantially white light, illuminating a blue absorbing uniform backing placed behind said foreground field with green and red light, making original records of the blue, green and red color aspects of said foreground field with backing, regulating the illumination with green light of said foreground field and of said backing to render the green light reflected from all points of the foreground field of somewhat lower intensity than the green light reflected from the backing, making from the blue color aspect record of the foreground field a positive, photographically printing a combined matte record from said positive and the original green foreground record, developing said combined record to a high contrast between the backing and foreground portions, respectively, printing a second matte from said combined record, and making composite prints from said original records in superposition with said mattes.

4. In the art of composite photography where pictures are printed with a matte covering part of the record field, the method of making pictures in natural colors which comprises illuminating a background object field with substantially white light, making original records of the blue, green and red color aspects of said background field, illuminating a foreground object field with substantially white light, illuminating a blue absorbing uniform backing placed behind said foreground field with green and red light, making original records of the blue, green and red color aspects of said foreground field with backing, regulating the illumination with green light of said foreground field and of said backing to render the green light reflected from all points of the foreground field of somewhat lower intensity than the green light reflected from the backing, making from the green color aspect record of the foreground field a positive, photographically printing a combined matte record from said positive and the original blue foreground record, developing said combined record to a high contrast between the backing and foreground portions, respectively, printing a second matte from said combined record, and making composite prints from said original records in superposition with said mattes.

5. In the art of color photography the method of producing pictures which comprises making records of color aspect ranges of a background field, making color aspect records of the said ranges of light as reflected from a foreground field illuminated with light of said ranges and placed in front of a uniform backing emitting light within said ranges but lacking one of said ranges, making a matte print by exposure in register with a foreground color aspect record substantially responsive, and a second foreground color aspect record substantially unresponsive to said lacking range, and photographically printing said background and foreground records together with said matte print, whereby foreground and background areas can be combined on a single record.

6. In the art of color photography the method of producing pictures which comprises making records of color aspect ranges of a background field, making color aspect records of the said ranges of light as reflected from a foreground field illuminated with light of said ranges and placed in front of a uniform backing emitting light within said ranges but lacking one of said ranges, making by exposure in register with a foreground color aspect record substantially responsive, and a second foreground record substantially unresponsive to said lacking range a silhouette matte print with maximum contrast between the foreground and background areas, and photographically printing said background and foreground records together with said matte print, whereby foreground and background areas can be combined on a single record.

7. In the art of composite photography with mattes for covering selected picture areas while printing, the method of making pictures in natural colors, which comprises making color aspect records of a foreground object field against a backing reflecting light of a spectral range which effects maximum and minimum exposures, respectively, of two of said color aspect records, said foreground and said backing being during the making of said records colored and illuminated to render the reflection of said range from all points of the foreground lower than its reflection from the backing, and making from said two color aspect records a matte print with areas having substantially uniform densities of either extreme on which are recorded said foreground and said backing, respectively.

LESLIE W. OLIVER.